(12) United States Patent
Ueda

(10) Patent No.: US 8,421,878 B2
(45) Date of Patent: Apr. 16, 2013

(54) WHITE BALANCE ADJUSTMENT SYSTEM FOR SOLID-STATE ELECTRONIC IMAGE SENSING DEVICE, AND METHOD OF CONTROLLING OPERATION OF SAME

(75) Inventor: Toru Ueda, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 175 days.

(21) Appl. No.: 12/884,987

(22) Filed: Sep. 17, 2010

(65) Prior Publication Data
US 2011/0063474 A1    Mar. 17, 2011

(30) Foreign Application Priority Data
Sep. 17, 2009  (JP) ................................. 2009-215212

(51) Int. Cl.
  *H04N 9/73*    (2006.01)
(52) U.S. Cl.
  USPC ...................................................... 348/223.1
(58) Field of Classification Search ............... 348/223.1, 348/42, 47
  See application file for complete search history.

(56) References Cited

U.S. PATENT DOCUMENTS

| | | | | |
|---|---|---|---|---|
| 7,423,674 | B2 * | 9/2008 | Takeshita | .................... 348/223.1 |
| 7,432,961 | B2 * | 10/2008 | Takeshita | .................... 348/227.1 |
| 7,940,295 | B2 * | 5/2011 | Takayama | ....................... 348/42 |
| 2005/0122409 | A1 * | 6/2005 | Takeshita | .................... 348/223.1 |
| 2007/0201853 | A1 * | 8/2007 | Petschnigg | .................... 396/155 |
| 2008/0024596 | A1 * | 1/2008 | Li et al. | ........................... 348/47 |
| 2009/0015689 | A1 * | 1/2009 | Murayama | .................. 348/229.1 |
| 2010/0149403 | A1 * | 6/2010 | Wang et al. | .................... 348/335 |

FOREIGN PATENT DOCUMENTS

| | | |
|---|---|---|
| JP | 5-110939 A | 4/1993 |
| JP | 2004200885 A | 7/2004 |
| JP | 2008206090 A | 9/2008 |
| JP | 2009-017457 A | 1/2009 |

OTHER PUBLICATIONS

Notification of Reasons for Refusal, dated Oct. 23, 2012, issued in corresponding JP Application No. 2009-215212, 7 pages in English and Japanese.

* cited by examiner

Primary Examiner — Chieh M Fan
Assistant Examiner — Fayez Bhuiyan
(74) Attorney, Agent, or Firm — Sughrue Mion, PLLC

(57) ABSTRACT

A main solid-state electronic image sensing device and a subordinate solid-state electronic image sensing device are included in a digital camera. The light source is estimated from image data obtained from the main electronic image sensing device, and white balance gain conforming to the estimated light source is calculated for the purpose of white balance adjustment. When the setting is such that white balance gain regarding image data that has been output from the subordinate solid-state electronic image sensing device conforms to the light source estimated from the image data of the main solid-state electronic image sensing device, the gain is calculated accordingly. When the setting is such that white balance gain regarding image data that has been output from the subordinate solid-state electronic image sensing device conforms to a light source estimated from the image data of the subordinate solid-state electronic image sensing device, the gain is calculated accordingly.

6 Claims, 5 Drawing Sheets

WHITE BALANCE ADJUSTMENT SYSTEM FOR SOLID-STATE ELECTRONIC IMAGE SENSING DEVICE, AND METHOD OF CONTROLLING OPERATION OF SAME

BACKGROUND OF THE INVENTION

1. Field of the Invention

This invention relates to a system for white balance adjustment of a solid-state electronic image sensing device and to a method of controlling operation of this system.

2. Description of the Related Art

Digital still cameras equipped with multiple solid-state electronic image sensing devices have been realized. A white balance adjustment is performed in a digital still camera even in a case where the camera is provided with multiple solid-state electronic image sensing devices (see the specifications of Japanese Patent Application Laid-Open Nos. 2009-17457 and 5-110939). Although there are cases where the light source and related components for illuminating the subject of photography of one solid-state electronic image sensing device and the light source and related components for illuminating the subject of photography of another solid-state electronic image sensing device coincide, there are also cases where they are different. This means that there are instances where an appropriate white balance adjustment cannot be applied to all image data that is output from multiple solid-state electronic image sensing devices.

SUMMARY OF THE INVENTION

An object of the present invention is to perform an appropriate white balance adjustment even in a case where a digital camera (inclusive of a digital still camera and a movie digital camera) is equipped with multiple solid-state electronic image sensing devices.

According to the present invention, the foregoing object is attained by providing a system for white balance adjustment of a solid-state electronic image sensing device, comprising: a main solid-state electronic image sensing device for imaging a subject and outputting color image data representing the subject image; one or a plurality of subordinate solid-state electronic image sensing devices for imaging a subject and outputting color image data representing the subject image; a white balance adjustment device (means) for performing a white balance adjustment of the color image data that has been output from the main solid-state electronic image sensing device and of the color image data that has been output from the subordinate solid-state electronic image sensing device; a first decision device (means) for deciding gain of the white balance adjustment device regarding the color image data, which is output from the main solid-state electronic image sensing device, based upon the color image data that is output from the main solid-state electronic image sensing device; a determination device (means) for determining, for each of the one or plurality of subordinate solid-state electronic image sensing devices, whether the gain of the white balance adjustment device regarding the color image data that is output from the one or plurality of subordinate solid-state electronic image sensing devices is to be decided using the color image data that is output from the main solid-state electronic image sensing device or using the color image data that is output from the subordinate solid-state electronic image sensing device; a second decision device (means) for (a) deciding, with regard to the subordinate solid-state electronic image sensing device for which it has been determined by the determination device that the gain of the white balance adjustment device is to be decided using the color image data that is output from the main solid-state electronic image sensing device, and based upon the color image data that is output from the main solid-state electronic image sensing device, the gain of the white balance adjustment device regarding the color image data that is output from this subordinate solid-state electronic image sensing device, and (b) deciding, with regard to the subordinate solid-state electronic image sensing device for which it has been determined by the determination device that the gain of the white balance adjustment device is to be decided using the color image data that is output from the subordinate solid-state electronic image sensing device, and based upon the color image data that is output from this subordinate solid-state electronic image sensing device, the gain of the white balance adjustment device regarding the color image data that is output from this subordinate solid-state electronic image sensing device; and a control device (means) for controlling the white balance adjustment device in such a manner that a white balance adjustment is performed with regard to input color image data using the gain decided by the first decision device or the gain decided by the second decision device.

The present invention also provides an operation control method suited to the above-described system for white balance adjustment of a solid-state electronic image sensing device. Specifically, the present invention provides a method of controlling operation of a system for white balance adjustment of a solid-state electronic image sensing device, the method comprising the steps of: a main solid-state electronic image sensing device imaging a subject and outputting color image data representing the subject image; one or a plurality of subordinate solid-state electronic image sensing devices imaging a subject and outputting color image data representing the subject image; a white balance adjustment device performing a white balance adjustment of the color image data that has been output from the main solid-state electronic image sensing device and of the color image data that has been output from the subordinate solid-state electronic image sensing device; a first decision device deciding gain of the white balance adjustment device regarding the color image data, which is output from the main solid-state electronic image sensing device, based upon the color image data that is output from the main solid-state electronic image sensing device; a determination device determining, for each of the one or plurality of subordinate solid-state electronic image sensing devices, whether the gain of the white balance adjustment device regarding the color image data that is output from the one or plurality of subordinate solid-state electronic image sensing devices is to be decided using the color image data that is output from the main solid-state electronic image sensing device or using the color image data that is output from the subordinate solid-state electronic image sensing device; a second decision device (a) deciding, with regard to a subordinate solid-state electronic image sensing device for which it has been determined by the determination device that the gain of the white balance adjustment device is to be decided using the color image data that is output from the main solid-state electronic image sensing device, and based upon the color image data that is output from the main solid-state electronic image sensing device, the gain of the white balance adjustment device regarding the color image data that is output from this subordinate solid-state electronic image sensing device, and (b) deciding, with regard to a subordinate solid-state electronic image sensing device for which it has been determined by the determination device that the gain of the white balance adjustment device is to be decided using the color image data that is output from the subordinate solid-state electronic image sensing device, and based upon the color image data that is output from this subordinate solid-state electronic image sensing device, the gain of the white balance adjustment device regarding the color image data that is output from this subordinate solid-state electronic image sensing device; and a control device controlling the white balance adjustment device in such a manner that a white balance adjustment is performed with regard to input color image data using the gain decided by the first decision device or the gain decided by the second decision device.

In accordance with the present invention, a main solid-state electronic image sensing device and one or a plurality of subordinate solid-state electronic image sensing devices are provided. Based upon color image data that has been output from the main solid-state electronic image sensing device, the gain of a white balance adjustment device for color image data that is output from the main solid-state electronic image sensing device is decided. With regard to the gain of the white balance adjustment for color image data that is output from the one or plurality of subordinate solid-state electronic image sensing devices, it is determined, for every subordinate solid-state electronic image sensing device, whether the gain is to be decided based upon the color image data that is output from the main solid-state electronic image sensing device or decided based upon the color image data that is output from the subordinate solid-state electronic image sensing device. With regard to a subordinate solid-state electronic image sensing device for which it has been determined that the gain of the white balance adjustment device is to be decided based upon the color image data that is output from the main solid-state electronic image sensing device, the gain is decided based upon the color image data that has been output from the main solid-state electronic image sensing device. With regard to a subordinate solid-state electronic image sensing device for which it has been determined that the gain of the white balance adjustment device is to be decided based upon the color image data that is output from the subordinate solid-state electronic image sensing device, the gain is decided based upon the color image data that has been output from the subordinate solid-state electronic image sensing device. Thus, an appropriate white balance adjustment can be performed with regard to all image data that is output from a plurality of solid-state electronic image sensing devices. The terms "main solid-state electronic image sensing device" and "subordinate solid-state electronic image sensing device" have been assigned merely to indicate which is to serve as the reference for the white balance adjustment; any of the plurality of solid-state electronic image sensing devices may be treated as a main or subordinate solid-state electronic image sensing device. Further, an imaging apparatus provided with a plurality of solid-state electronic image sensing devices can be utilized in shooting 3D, and in shooting while changing the focal length on each solid-state electronic image sensing device, as in tele-angle shooting and in wide-angle shooting.

By way of example, the determination device, based upon a predetermined set condition, determines, for each of the one or plurality of subordinate solid-state electronic image sensing devices, whether the gain of the white balance adjustment device regarding the color image data that is output from the one or plurality of subordinate solid-state electronic image sensing devices is to be decided using the color image data that is output from the main solid-state electronic image sensing device or using the color image data that is output from the subordinate solid-state electronic image sensing device.

Preferably, in a case where imaging lenses are provided for respective ones of the main and subordinate solid-state electronic image sensing devices, the system further comprises a focal-length difference calculation device (means) for calculating the difference between focal length of the imaging lens provided for the main solid-state electronic image sensing device and focal length of the imaging lens provided for the subordinate solid-state electronic image sensing device.

In this case, by way of example, the determination device decides the gain of the white balance adjustment device using the color image data, which is output from the subordinate solid-state electronic image sensing device, in a case where the focal-length difference calculated by the focal-length distance calculation device is greater than a prescribed threshold value, and decides the gain of the white balance adjustment device using the color image data, which is output from the main solid-state electronic image sensing device, in a case where the focal-length difference calculated by the focal-length distance calculation device is equal to or less than the prescribed threshold value.

The system may further comprise a shooting determination device (means) for determining whether or not to shoot under a flickering light source; and a first shutter-speed determination device (means), responsive to a determination by the shooting determination device to shoot under a flickering light source, for determining whether the shutter speed of the main solid-state electronic image sensing device is greater than a threshold value. In this case, the determination device, in response to a determination by the first shutter-speed determination device that the shutter speed of the main solid-state electronic image sensing device is greater than a threshold value, decides the gain of the white balance adjustment device regarding the color image data, which is output from the one or plurality of subordinate solid-state electronic image sensing devices, using the color image data that is output from the subordinate solid-state electronic image sensing device.

The system may further comprise a second shutter-speed determination device (means), responsive to a determination by the first shutter-speed determination device that the shutter speed of the main solid-state electronic image sensing device is equal to or less than the threshold value, for determining whether the shutter speeds of respective ones of the one or plurality of subordinate solid-state electronic image sensing devices are equal to or less than the threshold value. In this case, by way of example, with regard to a subordinate solid-state electronic image sensing device for which it has been determined by the second shutter-speed determination device that the shutter speed is equal to or less than the threshold value, the determination device decides the gain of the white balance adjustment device using the color image data that is output from the main solid-state electronic image sensing device, and with regard to a subordinate solid-state electronic image sensing device for which it has been determined by the second shutter-speed determination device that the shutter speed is greater than the threshold value, the determination device decides the gain of the white balance adjustment device using the color image data that is output from the subordinate solid-state electronic image sensing device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of the present invention will now be described in detail with reference to the drawings.

Figure 1:
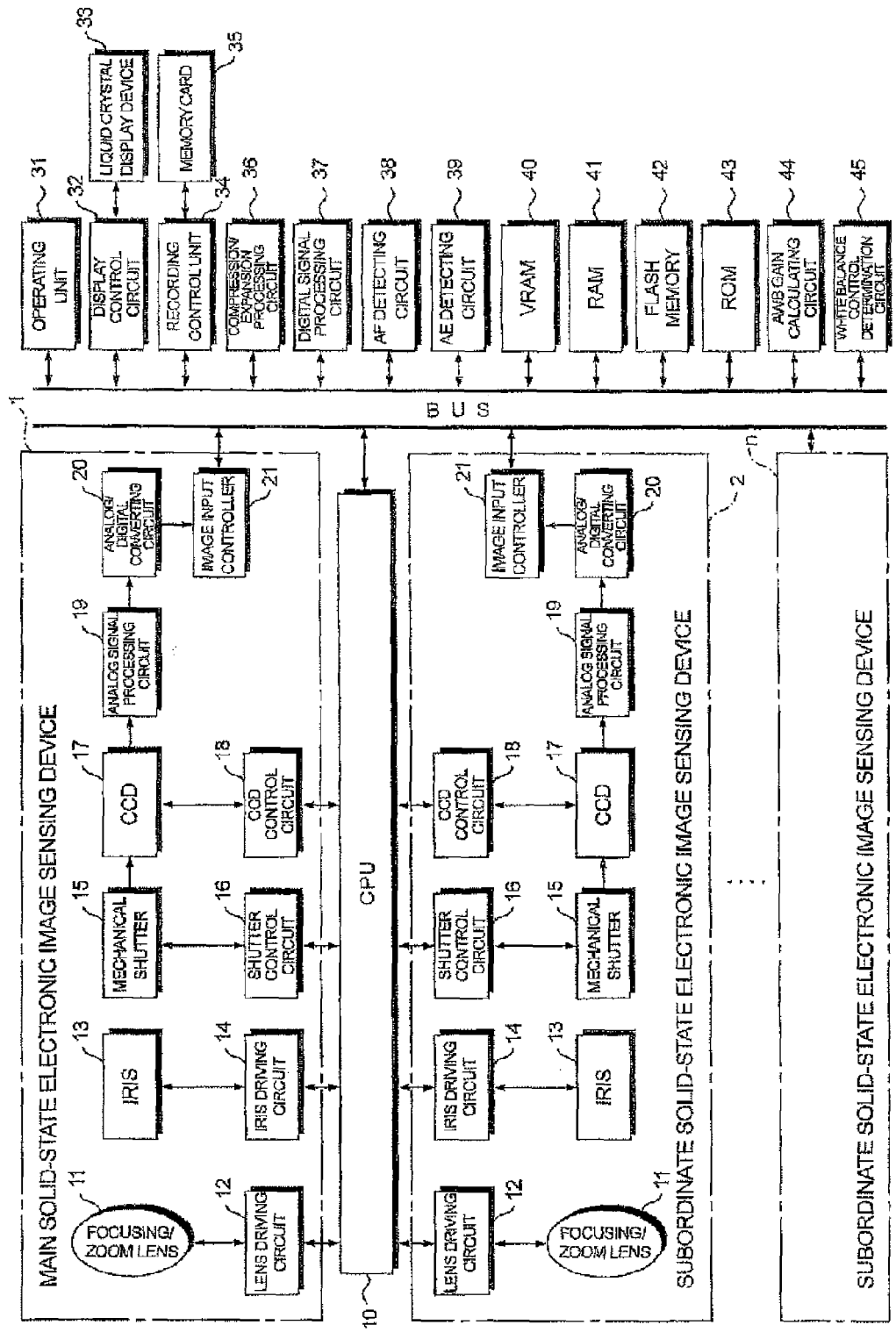
FIG. 1 is a block diagram illustrating the electrical configuration of a digital still camera.

FIG. 1 is a block diagram illustrating the configuration of a digital still camera according to an embodiment of the present invention.

The overall operation of the digital still camera is controlled by a CPU 10.

The digital still camera includes an operating unit 31 having various buttons such as a shutter-release button and a mode setting button for setting modes such as an imaging mode and a playback mode. An operating signal that is output from the operating unit 31 is input to the CPU 10. The digital still camera includes a VRAM (video random-access memory) 40, a RAM 41, a flash memory 42 and a ROM (read-only memory) 43 storing an operating program and prescribed data, etc.

The digital still camera includes one main solid-state electronic image sensing device 1 and n (where n is one or a plurality) subordinate solid-state electronic image sensing devices 2 to n. Since the digital still camera is a 3D camera, for example, it includes a plurality of solid-state electronic image sensing devices.

The main solid-state electronic image sensing device 1 includes a CCD 17 the operation of which is controlled by a CCD control circuit 18. A focusing lens and zoom lens (a focusing/zoom lens and imaging lens) 11, an iris 13 and a mechanical shutter 15 are provided in front of the CCD 17. The focusing/zoom lens 11 is positioned by a lens driving circuit 12. The iris 13 has its f-stop number decided by an iris driving circuit 14. The shutter speed of the mechanical shutter 15 is controlled by a shutter control circuit 16.

If the imaging mode is set, a subject is imaged by the CCD 17. By imaging the subject, the CCD 17 outputs a color video signal representing the image of the subject. The color video signal that has been output from the CCD 17 is subjected to prescribed analog signal processing by an analog signal processing circuit 19. The color video signal that has been output from the analog signal processing circuit 19 is converted to digital color image data by an analog/digital converting circuit 20.

The digital color image data is input to an AF detecting circuit 38 and AE detecting circuit 39 via an image input controller 21. The AF detecting circuit 38 detects an in-focus value representing the degree of focus based upon the color image data that has been input thereto. Based upon the detected in-focus value, the focusing/zoom lens 11 is positioned by the lens driving circuit 12 in such a manner that the image of the subject comes into focus on the imaging surface of the CCD 17. The AE detecting circuit 39 detects an exposure value based upon the color image data that has been input thereto. On the basis of the detected exposure value, the iris 13 and mechanical shutter 15 are driven by the iris driving circuit 14 and shutter control circuit 16, respectively, in such a manner that an appropriate amount of exposure is obtained.

An automatic white balance gain calculating circuit 44 calculates the gain of white balance. Data representing the calculated gain is input to a digital signal processing circuit 37, which proceeds to perform a white balance adjustment at the calculated gain. The color image data that has been subjected to the white balance adjustment is displayed on a liquid crystal display device 33 under the control of a display control circuit 32, whereupon the image of the subject imaged by the main solid-state electronic image sensing device 1 is displayed on the liquid crystal display device 33.

When the shutter-release button is pressed, the color image data obtained in the manner set forth above is input to a compression/expansion processing circuit 36. Upon being compressed by the compression/expansion processing circuit 36, the color image data is recorded on a memory card 35 by a recording control unit 34.

When the playback mode is set, image data that has been recorded on the memory card 35 is read and reproduced. This processing, however, need not be described here.

Each of the n-number of subordinate solid-state electronic image sensing devices 2 to n has a configuration identical with that of the main solid-state electronic image sensing device 1. In a manner similar to that of the main solid-state electronic image sensing device 1, a subject is imaged and color image data obtained in each of the n-number of subordinate solid-state electronic image sensing devices 2 to n. Gain for a white balance adjustment is calculated and the white balance adjustment performed at the calculated gain in each of the n-number of subordinate solid-state electronic image sensing devices 2 to n in the manner described above.

In this embodiment, with regard to the image data that is output from the main solid-state electronic image sensing device 1, the automatic white balance gain calculating circuit 44 uses this image data to estimate the kind of light source under which shooting (imaging) is being performed and calculates the gain of white balance that conforms to the estimated light source. With regard to the subordinate solid-state electronic image sensing devices 2 to n, a determination is made as to whether image data that is output from the main solid-state electronic image sensing device 1 or from the subordinate solid-state electronic image sensing devices 2 to n is to be used to estimate the kind of light source under which shooting is being performed. Thus, with regard to the subordinate solid-state electronic image sensing devices 2 to n, the circuit that determines whether the image data that is output from the main solid-state electronic image sensing device 1 or from the subordinate solid-state electronic image sensing devices 2 to n is to be used to calculate the gain of white balance is a white balance control determination circuit 45.

Figure 2:
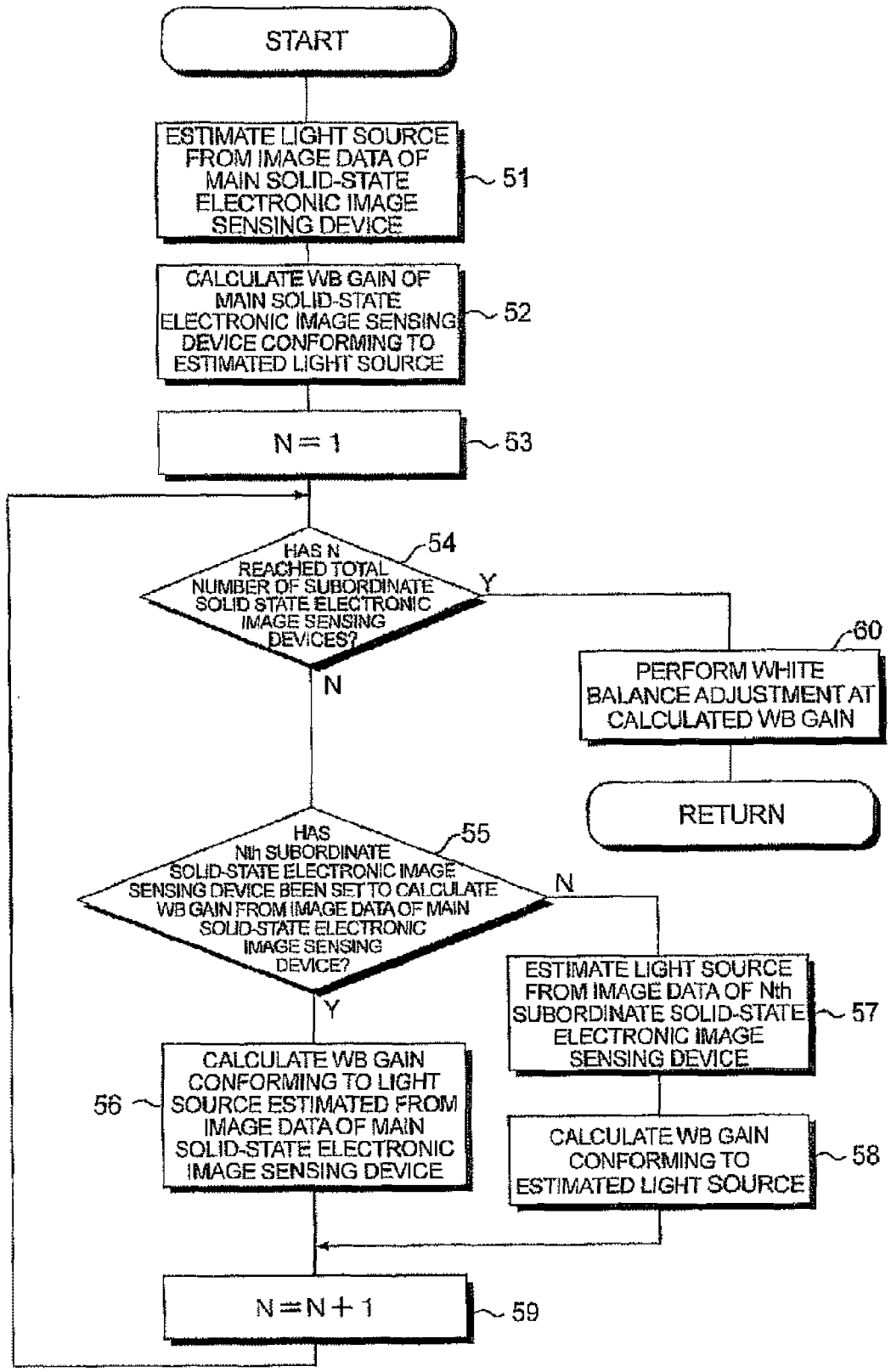
FIG. 2 is a flowchart illustrating processing for calculating white balance gain according to an embodiment of the present invention.

FIG. 2 is a flowchart illustrating processing for calculating white balance gain.

As described above, the main solid-state electronic image sensing device 1 images a subject and inputs color image data representing the image of the subject to the automatic white balance gain calculating circuit 44. Based upon the color image data that has been input, an estimation is made as to the light source or kind of light source under which the subject is being imaged by the main solid-state electronic image sensing device 1 (step 51). A subject can be imaged beforehand under various light sources, a distribution of color image data obtained for every light source can be stored in advance, and the light source can be estimated from these distributions of color image data and the distribution of the image data that has been output from the main solid-state electronic image sensing device 1. The white balance gain conforming to the estimated light source is calculated by the automatic white balance gain calculating circuit 44 in such a manner that an appropriate white balance adjustment will be applied to the image data that is output from the main solid-state electronic image sensing device 1 (step 52). Although the white balance gain is calculated after the light source is estimated, it may be so arranged that the white balance gain is calculated without estimating the light source.

Next, when a variable N is reset (step 53) and white balance gains have been calculated with regard to all subordinate solid-state electronic image sensing devices 2 to n (i.e., when the variable N has become a number equal to the total number of subordinate solid-state electronic image sensing devices 2 to n) ("YES" at step 54), the color image data that has been output from respective ones of the main solid-state electronic image sensing device 1 and subordinate solid-state electronic image sensing devices 2 to n is subjected to a white balance adjustment at respective ones of the calculated white balance gains (step 60).

If white balance gains regarding all of the solid-state electronic image sensing devices 2 to n have not been calculated ("NO" at step 54), then it is determined whether the setting is such that the white balance gain of color image data that has been output from an Nth subordinate solid-state electronic image sensing device will be calculated based upon the color image data that has been output from the main solid-state electronic image sensing device 1 (step 55). It goes without saying that this setting may be made beforehand using the operating unit 31.

If the setting is such that the white balance gain of color image data that has been output from an Nth subordinate solid-state electronic image sensing device will be calculated based upon the color image data that has been output from the main solid-state electronic image sensing device 1 ("YES" at step 55), then automatic white balance conforming to the light source estimated from the image data that has been output from the main solid-state electronic image sensing device 1 is calculated in the manner described above (step 56). The white balance gain thus calculated becomes the white balance gain of the color image data that has been output from the Nth subordinate solid-state electronic image sensing device.

If the setting is not such that the white balance gain of color image data that has been output from an Nth subordinate solid-state electronic image sensing device will be calculated based upon the color image data that has been output from the main solid-state electronic image sensing device 1 ("NO" at step 55), then the light source illuminating the subject being imaged by the Nth subordinate solid-state electronic image sensing device is estimated from the color image data that has been output from the Nth subordinate solid-state electronic image sensing device (step 57). The white balance gain conforming to the estimated light source is then calculated (step 58).

When the white balance gain regarding the color image data that is output from the subordinate solid-state electronic image sensing device is thus calculated, the variable N is incremented (step 59) and white balance gain regarding the color image data that is output from the next subordinate solid-state electronic image sensing device is calculated.

Thus, whether the calculation of white balance gain regarding color image data that has been output from respective ones of the subordinate solid-state electronic image sensing devices 2 to n is performed based upon the color image data that has been output from the main solid-state electronic image sensing device 1 or based upon the color image data that has been output from respective ones of the subordinate solid-state electronic image sensing devices 2 to n can be decided in accordance with the setting.

Figure 3:
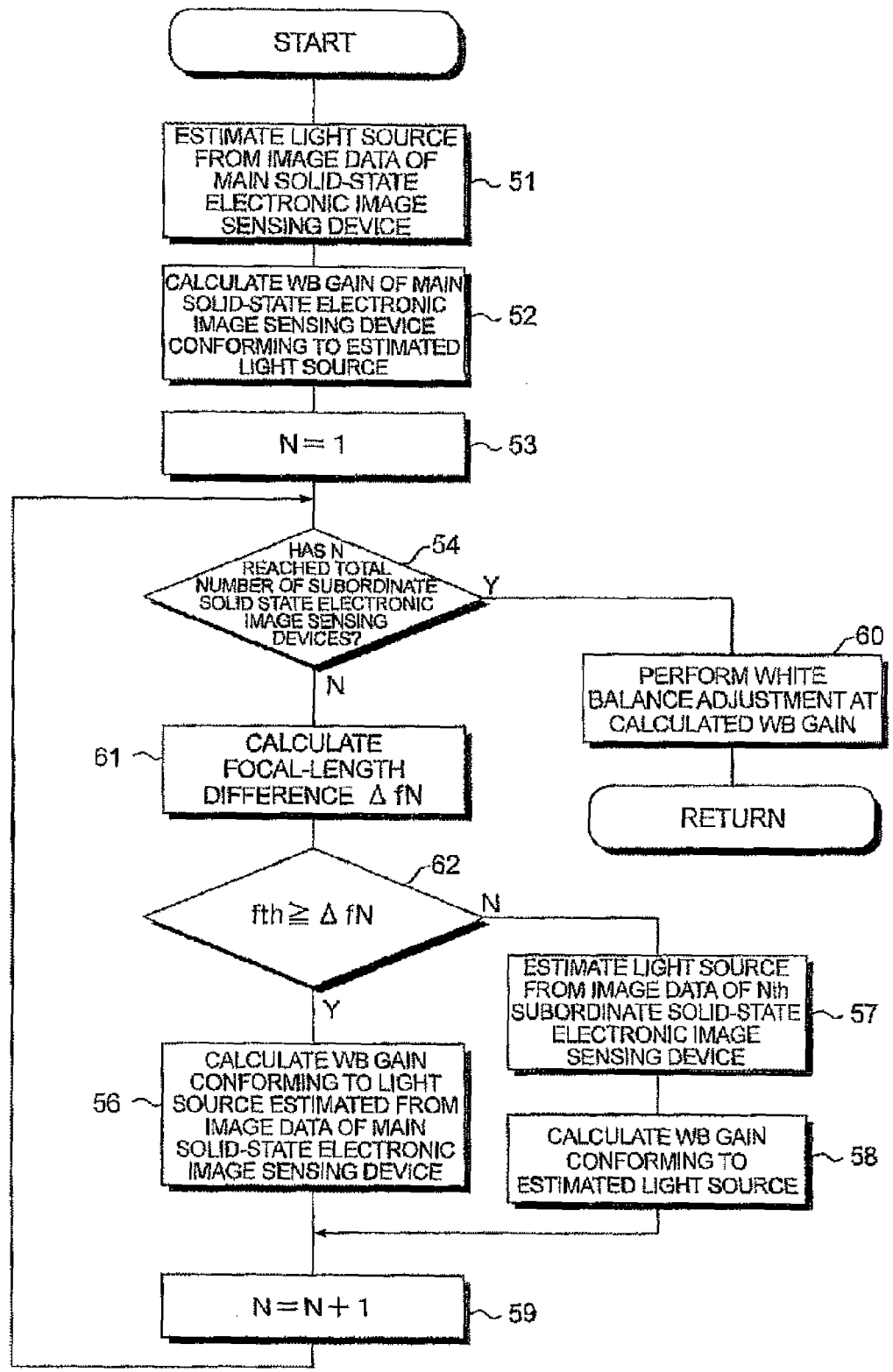
FIG. 3 is a flowchart illustrating processing for calculating white balance gain according to another embodiment of the present invention.

FIG. 3 is a flowchart illustrating processing for calculating white balance gain according to another embodiment of the present invention. Processing steps in FIG. 3 identical with those shown in FIG. 2 are designated by like step numbers and need not be described again.

In the embodiment described above, whether the calculation of white balance gain regarding color image data that has been output from respective ones of the subordinate solid-state electronic image sensing devices 2 to n is performed based upon the color image data that has been output from the main solid-state electronic image sensing device 1 or based upon the color image data that has been output from respective ones of the subordinate solid-state electronic image sensing devices 2 to n is decided in accordance with the setting. However, this embodiment utilizes the focal length of the focusing/zoom lens 11.

If white balance gains regarding all of the solid-state electronic image sensing devices 2 to n have not been calculated ("NO" at step 54), then a focal-length difference $\Delta fN$ between focal length fmain of the focusing/zoom lens 11 of the main solid-state electronic image sensing device 1 and focal length fsubN of the focusing/zoom lens 11 of the subordinate solid-state electronic image sensing device is calculated (step 61).

If the focal-length difference $\Delta fN$ is equal to or less than a prescribed threshold value fth ("YES" at step 62), then it may be considered that the angle of view of main solid-state electronic image sensing device 1 and the angle of view of the subordinate solid-state electronic image sensing devices 2 to n are not very different. The influence of the light source on the image data that is output from the main solid-state electronic image sensing device 1 is almost identical with the influence of the light source on the image data that is output from the subordinate solid-state electronic image sensing devices 2 to n. This means that the white balance gain of the image data that has been output from the subordinate solid-state electronic image sensing devices 2 to n is the white balance gain conforming to the light source estimated from the image data that has been output from the main solid-state electronic image sensing device 1 (step 56).

If the focal-length difference $\Delta fN$ is greater than the prescribed threshold value fth ("NO" at step 62), then the angle of view of the main solid-state electronic image sensing device 1 is different from that of the subordinate solid-state electronic image sensing devices 2 to n such that one will be imaging a far subject and the other will be imaging a near subject. That is, influence of the light source on the image data that is output from the main solid-state electronic image sensing device 1 and the influence of the light source on the image data that is output from the subordinate solid-state electronic image sensing devices 2 to n will be too different to ignore. This means that the white balance gain of the image data that has been output from the Nth subordinate solid-state electronic image sensing device is the white balance gain conforming to the light source estimated from the image data that has been output from this Nth subordinate solid-state electronic image sensing device (steps 57, 58). For example, if the focusing/zoom lens 11 of the main solid-state electronic image sensing device 1 is at the wide-angle end for shooting a night scene and the focusing/zoom lens 11 of the Nth subordinate solid-state electronic image sensing device is at the telephoto end for shooting the face of a person that occupies most of the shooting zone, then, with regard to the image data that is output from the Nth subordinate solid-state electronic image sensing device, the white balance gain is decided based upon the image data that is output from the Nth subordinate solid-state electronic image sensing device. An appropriate white balance gain is thus obtained.

In the embodiment described above, it goes without saying that it is so arranged that the prescribed threshold value fth is given as a parameter when the digital still camera is designed, and that the focal length is calculated in 35-mm terms so that the focal-length difference can be calculated accurately.

Figure 4:
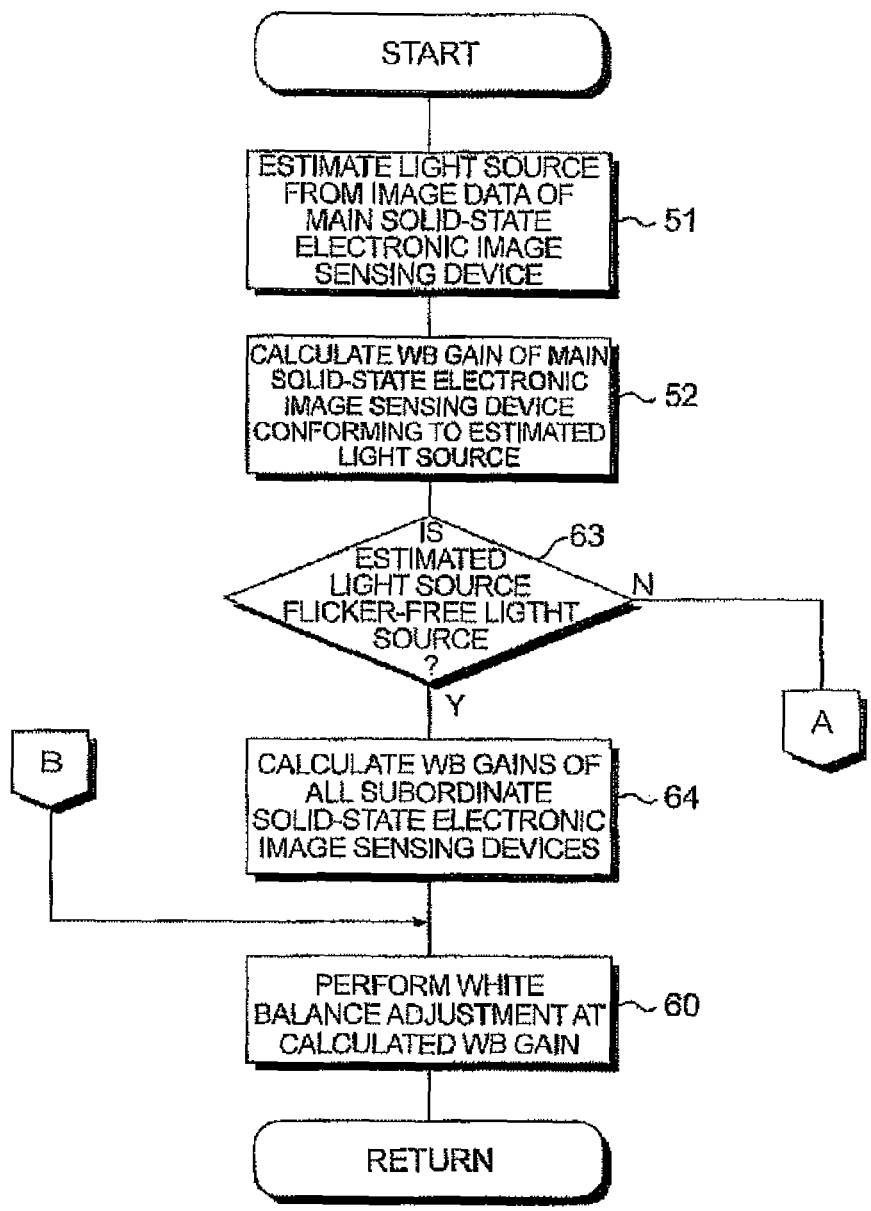
FIGS. 4 and 5 are flowcharts illustrating processing for calculating white balance gain according to a further embodiment of the present invention.
Figure 5:
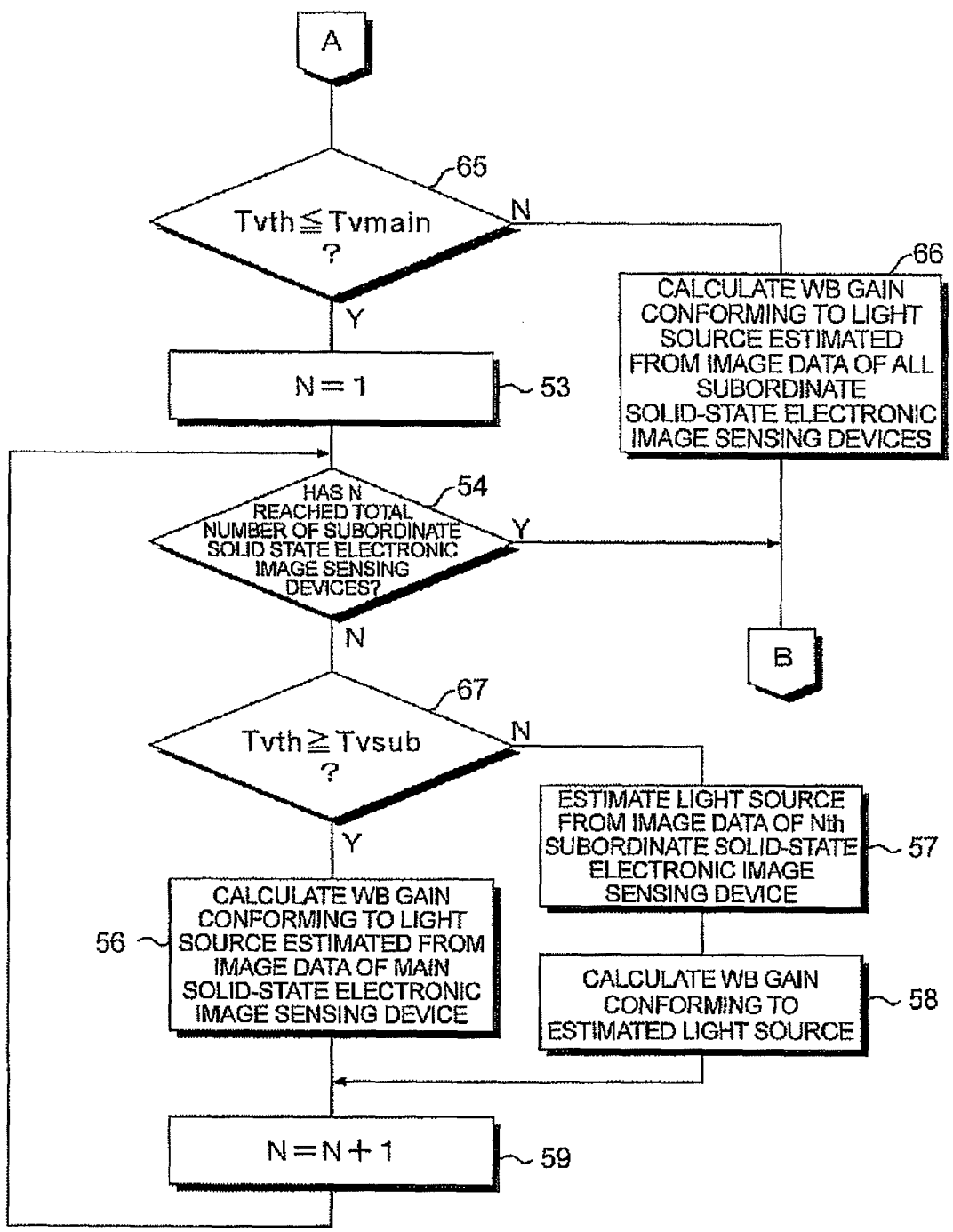

FIGS. 4 and 5 are flowcharts illustrating processing for calculating white balance gain according to a further embodiment of the present invention. Processing steps in FIGS. 4 and 5 identical with those shown in FIG. 2 are designated by like step numbers and need not be described again.

In this embodiment, whether the calculation of white balance gain regarding color image data that has been output from respective ones of the subordinate solid-state electronic image sensing devices 2 to n is performed based upon the color image data that has been output from the main solid-state electronic image sensing device 1 or based upon the color image data that has been output from respective ones of the subordinate solid-state electronic image sensing devices 2 to n is decided based upon whether the estimated light source is flickering or not, the value of the shutter speed, etc.

When the light source is estimated from the image data that has been output from the main solid-state electronic image sensing device 1 (step 51) and white balance gain is calculated in accordance with the estimated light source (step 52), it is determined whether the estimated light source is a flicker-free light source (step 63).

If the light source is a flicker-free light source ("YES" at step 63), then the white balance gains of all of the subordinate solid-state electronic image sensing devices 2 to n are calculated (step 64). If shooting takes place under a flickering light source, then the image obtained by such shooting will be affected by such flicker when shooting is performed at a shutter speed faster than the flicker cycle. However, if shooting takes place under a flicker-free light source, then it is unnecessary to take the effects of flicker into consideration and therefore the white balance gains of the subordinate solid-state electronic image sensing devices 2 to n are calculated without taking flicker into account. The white balance gains of the subordinate solid-state electronic image sensing devices 2 to n may be decided to be those in accordance with the light source estimated from the image data that has been output from main solid-state electronic image sensing device 1, or the light source may be estimated from the image data that has been output from the subordinate solid-state electronic image sensing devices 2 to n and the white balance gains of the subordinate solid-state electronic image sensing devices 2 to n may be decided to be those in accordance with this estimated light source.

If the light source is a flickering light source ("NO" at step 63), then it is determined whether shutter speed Tvmain of the main solid-state electronic image sensing device 1 is equal to or less than a prescribed threshold value Tvth (e.g., 1/60 of a second) (step 65). If the shutter speed Tvmain of the main solid-state electronic image sensing device 1 is equal to or less than the prescribed threshold value Tvth (i.e., if the shutter speed Tvmain of the main solid-state electronic image sensing device 1 is equal to or slower than the prescribed threshold value Tvth) ("YES" at step 65), then the image data that has been output from the main solid-state electronic image sensing device 1 is considered not to be influenced by flicker. It is then determined whether the shutter speed Tvsub of the Nth subordinate solid-state electronic image sensing device is equal to or less than the prescribed threshold value Tvth (step 67).

If the shutter speed Tvsub of the Nth subordinate solid-state electronic image sensing device is equal to or less than the prescribed threshold value Tvth ("YES" at step 67), then it is considered that the image data that has been output from the Nth subordinate solid-state electronic image sensing device is not influenced by flicker in a manner similar to the image data that has been output from the main solid-state electronic image sensing device 1. Accordingly, white balance gain conforming to the light source estimated based upon the image data that has been output from the main solid-state electronic image sensing device 1 is calculated (step 56).

If the shutter speed Tvsub of the Nth subordinate solid-state electronic image sensing device is greater than the prescribed threshold value Tvth (i.e., if the shutter speed Tvsub of the Nth subordinate solid-state electronic image sensing device is faster than the prescribed threshold value Tvth) ("NO" at step 67), then it is considered that the image data that has been output from the Nth subordinate solid-state electronic image sensing device is influenced by flicker. Accordingly, a light source influenced by flicker is estimated from the image data that has been output the Nth subordinate solid-state electronic image sensing device (step 57). White balance gain conforming to the estimated light source is calculated (step 58).

If the shutter speed Tvmain of the main solid-state electronic image sensing device 1 is greater than the prescribed threshold value Tvth (i.e., if the shutter speed Tvmain of the main subordinate solid-state electronic image sensing device 1 is faster than the prescribed threshold value Tvth) ("NO" at step 65), then the accuracy of the white balance gain decided in accordance with the light source estimated based upon the image data that has been output from the main solid-state electronic image sensing device 1 is considered to be unreliable. In all of the subordinate solid-state electronic image sensing devices 2 to n, the light source is estimated from the image data that has been output from the subordinate solid-state electronic image sensing devices 2 to n and white balance gain conforming to the estimated light source is calculated (step 66).

As many apparently widely different embodiments of the present invention can be made without departing from the spirit and scope thereof, it is to be understood that the invention is not limited to the specific embodiments thereof except as defined in the appended claims.

What is claimed is:

1. A system for white balance adjustment of a solid-state electronic image sensing device, comprising:
a main solid-state electronic image sensing device for imaging a subject and outputting color image data representing the subject image;
one or a plurality of subordinate solid-state electronic image sensing devices for imaging a subject and outputting color image data representing the subject image;
a white balance adjustment device for performing a white balance adjustment of the color image data that has been output from said main solid-state electronic image sensing device and of the color image data that has been output from said subordinate solid-state electronic image sensing device;
a first decision device for deciding gain of said white balance adjustment device regarding the color image data, which is output from said main solid-state electronic image sensing device, based upon the color image data that is output from said main solid-state electronic image sensing device;
a determination device for determining, for each of said one or plurality of subordinate solid-state electronic image sensing devices, whether the gain of said white balance adjustment device regarding the color image data that is output from said one or plurality of subordinate solid-state electronic image sensing devices is to be decided using the color image data that is output from said main solid-state electronic image sensing device or using the color image data that is output from said subordinate solid-state electronic image sensing device;

a second decision device for (a) deciding, with regard to a subordinate solid-state electronic image sensing device for which it has been determined by said determination device that the gain of said white balance adjustment device is to be decided using the color image data that is output from said main solid-state electronic image sensing device, and based upon the color image data that is output from said main solid-state electronic image sensing device, the gain of said white balance adjustment device regarding the color image data that is output from this subordinate solid-state electronic image sensing device, and (b) deciding, with regard to a subordinate solid-state electronic image sensing device for which it has been determined by said determination device that the gain of said white balance adjustment device is to be decided using the color image data that is output from said subordinate solid-state electronic image sensing device, and based upon the color image data that is output from this subordinate solid-state electronic image sensing device, the gain of said white balance adjustment device regarding the color image data that is output from this subordinate solid-state electronic image sensing device; and a control device for controlling said white balance adjustment device in such a manner that a white balance adjustment is performed with regard to input color image data using the gain decided by said first decision device or the gain decided by said second decision device, wherein (a) the white balance adjustment for color image data that is output from said main solid-state electronic image sensing device is performed using the gain decided on the basis of the color image data that is output from said main solid-state electronic image sensing device, (b) the white balance adjustment for color image data that is output from said subordinate solid-state electronic image sensing device is performed (b-1) using the gain decided on the basis of the color image data that is output from said main solid-state electronic image sensing device in a case where the determination device determines that the gain is to be decided using the color image data that is output from said main solid-state electronic image sensing device, or (b-2) using the gain decided on the basis of the color image data that is output from said subordinate solid-state electronic image sensing device in a case where the determination device determines that the gain is to be decided using the color image data that is output from said subordinate solid-state electronic image sensing device; and wherein imaging lenses are provided for respective ones of said main and subordinate solid-state electronic image sensing devices, said system further comprising:

a focal-length difference calculation device for calculating the difference between focal length of the imaging lens provided for said main solid-state electronic image sensing device and focal length of the imaging lens provided for said subordinate solid-state electronic image sensing device;

wherein said determination device decides the gain of said white balance adjustment device using the color image data, which is output from said subordinate solid-state electronic image sensing device, in a case where the focal-length difference calculated by said focal-length difference calculation device is greater than a prescribed threshold value, and decides the gain of the white balance adjustment device using the color image data, which is output from said main solid-state electronic image sensing device, in a case where the focal-length difference calculated by said focal-length difference calculation device is equal to or less than the prescribed threshold value.

2. The system according to claim 1, wherein on the basis of a predetermined set condition, said determination device determines, for each of said one or plurality of subordinate solid-state electronic image sensing devices, whether the gain of said white balance adjustment device regarding the color image data that is output from said one or plurality of subordinate solid-state electronic image sensing devices is to be decided using the color image data that is output from said main solid-state electronic image sensing device or using the color image data that is output from said subordinate solid-state electronic image sensing device.

3. A system for white balance adjustment of a solid-state electronic image sensing device, comprising:

a main solid-state electronic image sensing device for imaging a subject and outputting color image data representing the subject image;

one or a plurality of subordinate solid-state electronic image sensing devices for imaging a subject and outputting color image data representing the subject image;

a white balance adjustment device for performing a white balance adjustment of the color image data that has been output from said main solid-state electronic image sensing device and of the color image data that has been output from said subordinate solid-state electronic image sensing device;

a first decision device for deciding gain of said white balance adjustment device regarding the color image data, which is output from said main solid-state electronic image sensing device, based upon the color image data that is output from said main solid-state electronic image sensing device;

a determination device for determining, for each of said one or plurality of subordinate solid-state electronic image sensing devices, whether the gain of said white balance adjustment device regarding the color image data that is output from said one or plurality of subordinate solid-state electronic image sensing devices is to be decided using the color image data that is output from said main solid-state electronic image sensing device or using the color image data that is output from said subordinate solid-state electronic image sensing device;

a second decision device for (a) deciding, with regard to a subordinate solid-state electronic image sensing device for which it has been determined by said determination device that the gain of said white balance adjustment device is to be decided using the color image data that is output from said main solid-state electronic image sensing device, and based upon the color image data that is output from said main solid-state electronic image sensing device, the gain of said white balance adjustment device regarding the color image data that is output from this subordinate solid-state electronic image sensing device, and (b) deciding, with regard to a subordinate solid-state electronic image sensing device for which it has been determined by said determination device that the gain of said white balance adjustment device is to be decided using the color image data that is output from said subordinate solid-state electronic image sensing device, and based upon the color image data that is output from this subordinate solid-state electronic image sensing device, the gain of said white balance adjustment device regarding the color image data that is output from this subordinate solid-state electronic image sensing device; and a control device for controlling said white balance adjustment device in such a manner that a white balance adjustment is performed with regard to input color image data using the gain decided by said first decision device or the gain decided by said second decision device, wherein (a) the white balance adjustment for color image data that is output from said main solid-state electronic image sensing device is performed using the gain decided on the basis of the color image data that is output from said main solid-state electronic image sensing device, (b) the white balance adjustment for color image data that is output from said subordinate solid-state electronic image sensing device is performed (b-1) using the gain decided on the basis of the color image data that is output from said main solid-state electronic image sensing device in a case where the determination device determines that the gain is to be decided using the color image data that is output from said main solid-state electronic image sensing device, or (b-2) using the gain decided on the basis of the color image data that is output from said subordinate solid-state electronic image sensing device in a case where the determination device determines that the gain is to be decided using the color image data that is output from said subordinate solid-state electronic image sensing device; and further comprising:

a shooting determination device for determining whether or not to shoot under a flickering light source; and a first shutter-speed determination device, responsive to a determination by said shooting determination device to shoot under a flickering light source, for determining whether the shutter speed of said main solid-state electronic image sensing device is greater than a threshold value;

wherein in response to a determination by said first shutter-speed determination device that the shutter speed of said main solid-state electronic image sensing device is greater than a threshold value, said determination device decides the gain of said white balance adjustment device regarding the color image data, which is output from said one or plurality of subordinate solid-state electronic image sensing devices, using the color image data that is output from said subordinate solid-state electronic image sensing device.

4. The system according to claim 3, further comprising:

a second shutter-speed determination device, responsive to a determination by said first shutter-speed determination device that the shutter speed of said main solid-state electronic image sensing device is equal to or less than the threshold value, for determining whether the shutter speeds of respective ones of said one or plurality of subordinate solid-state electronic image sensing devices are equal to or less than the threshold value;

wherein with regard to a subordinate solid-state electronic image sensing device for which it has been determined by said second shutter-speed determination device that the shutter speed is equal to or less than the threshold value, said determination device decides the gain of said white balance adjustment device using the color image data that is output from said main solid-state electronic image sensing device, and with regard to a subordinate solid-state electronic image sensing device for which it has been determined by said second shutter-speed determination device that the shutter speed is greater than the threshold value, said determination device decides the gain of said white balance adjustment device using the color image data that is output from said subordinate solid-state electronic image sensing device.

5. A method of controlling operation of a system for white balance adjustment of a solid-state electronic image sensing device, comprising the steps of:

performing main imaging of a subject and outputting color image data representing the subject image using a main solid-state electronic image sensing device;

performing subordinate imaging of a subject and outputting color image data representing the subject image using one or a plurality of subordinate solid-state electronic image sensing devices ;

performing a white balance adjustment of the color image data that has been output from the main solid-state electronic image sensing device and of the color image data that has been output from the subordinate solid-state electronic image sensing device using a white balance adjustment device;

deciding gain of the white balance adjustment device regarding the color image data, which is output from the main solid-state electronic image sensing device, based upon the color image data that is output from the main solid-state electronic image sensing device using a first decision device;

determining, for each of the one or plurality of subordinate solid-state electronic image sensing devices, whether the gain of the white balance adjustment device regarding the color image data that is output from the one or plurality of subordinate solid-state electronic image sensing devices is to be decided using the color image data that is output from the main solid-state electronic image sensing device or using the color image data that is output from the subordinate solid-state electronic image sensing device using a determination device;

deciding (a) with regard to a subordinate solid-state electronic image sensing device for which it has been determined by the determination device that the gain of the white balance adjustment device is to be decided using the color image data that is output from the main solid-state electronic image sensing device, and based upon the color image data that is output from the main solid-state electronic image sensing device, the gain of the white balance adjustment device regarding the color image data that is output from this subordinate solid-state electronic image sensing device, and (b) deciding, with regard to a subordinate solid-state electronic image sensing device for which it has been determined by the determination device that the gain of the white balance adjustment device is to be decided using the color image data that is output from the subordinate solid-state electronic image sensing device, and based upon the color image data that is output from this subordinate solid-state electronic image sensing device, the gain of the white balance adjustment device regarding the color image data that is output from this subordinate solid-state electronic image sensing device using a second decision device; and controlling the white balance adjustment device in such a manner that a white balance adjustment is performed with regard to input color image data using the gain decided by the first decision device or the gain decided by the second decision device using a control device, wherein (a) the white balance adjustment for color image data that is output from said main solid-state electronic image sensing device is performed using the gain decided on the basis of the color image data that is output from said main solid-state electronic image sensing device, (b) the white balance adjustment for color image data that is output from said subordinate solid-state electronic image sensing device is performed (b-1) using the gain decided on the basis of the color image data that is output from said main solid-state electronic image sensing device in a case where the determination device determines that the gain is to be decided using the color image data that is output from said main solid-state electronic image sensing device, or (b-2) using the gain decided on the basis of the color image data that is output from said subordinate solid-state electronic image sensing device in a case where the determination device determines that the gain is to be decided using the color image data that is output from said subordinate solid-state electronic image sensing device; and wherein imaging lenses are provided for respective ones of said main and subordinate solid-state electronic image sensing devices, said method further comprising: calculating the difference between focal length of the imaging lens provided for said main solid-state electronic image sensing device and focal length of the imaging lens provided for said subordinate solid-state electronic image sensing device using a focal-length difference calculation device;

wherein said determination device decides the gain of said white balance adjustment device using the color image data, which is output from said subordinate solid-state electronic image sensing device, in a case where the focal-length difference calculated by said focal-length difference calculation device is greater than a prescribed threshold value, and decides the gain of the white balance adjustment device using the color image data, which is output from said main solid-state electronic image sensing device, in a case where the focal-length difference calculated by said focal-length difference calculation device is equal to or less than the prescribed threshold value.

6. A method of controlling operation of a system for white balance adjustment of a solid-state electronic image sensing device, comprising the steps of:

performing main imaging of a subject and outputting color image data representing the subject image using a main solid-state electronic image sensing device;

performing subordinate imaging of a subject and outputting color image data representing the subject image using one or a plurality of subordinate solid-state electronic image sensing devices ;

performing a white balance adjustment of the color image data that has been output from the main solid-state electronic image sensing device and of the color image data that has been output from the subordinate solid-state electronic image sensing device using a white balance adjustment device;

deciding gain of the white balance adjustment device regarding the color image data, which is output from the main solid-state electronic image sensing device, based upon the color image data that is output from the main solid-state electronic image sensing device using a first decision device;

determining, for each of the one or plurality of subordinate solid-state electronic image sensing devices, whether the gain of the white balance adjustment device regarding the color image data that is output from the one or plurality of subordinate solid-state electronic image sensing devices is to be decided using the color image data that is output from the main solid-state electronic image sensing device or using the color image data that is output from the subordinate solid-state electronic image sensing device using a determination device;

deciding (a) with regard to a subordinate solid-state electronic image sensing device for which it has been determined by the determination device that the gain of the white balance adjustment device is to be decided using the color image data that is output from the main solid-state electronic image sensing device, and based upon the color image data that is output from the main solid-state electronic image sensing device, the gain of the white balance adjustment device regarding the color image data that is output from this subordinate solid-state electronic image sensing device, and (b) deciding, with regard to a subordinate solid-state electronic image sensing device for which it has been determined by the determination device that the gain of the white balance adjustment device is to be decided using the color image data that is output from the subordinate solid-state electronic image sensing device, and based upon the color image data that is output from this subordinate solid-state electronic image sensing device, the gain of the white balance adjustment device regarding the color image data that is output from this subordinate solid-state electronic image sensing device using a second decision device; and controlling the white balance adjustment device in such a manner that a white balance adjustment is performed with regard to input color image data using the gain decided by the first decision device or the gain decided by the second decision device using a control device, wherein (a) the white balance adjustment for color image data that is output from said main solid-state electronic image sensing device is performed using the gain decided on the basis of the color image data that is output from said main solid-state electronic image sensing device, (b) the white balance adjustment for color image data that is output from said subordinate solid-state electronic image sensing device is performed (b-1) using the gain decided on the basis of the color image data that is output from said main solid-state electronic image sensing device in a case where the determination device determines that the gain is to be decided using the color image data that is output from said main solid-state electronic image sensing device, or (b-2) using the gain decided on the basis of the color image data that is output from said subordinate solid-state electronic image sensing device in a case where the determination device determines that the gain is to be decided using the color image data that is output from said subordinate solid-state electronic image sensing device;

and further comprising the steps of:

determining whether or not to shoot under a flickering light source; and responding to a determination by said shooting determination device to shoot under a flickering light source, for determining whether the shutter speed of said main solid-state electronic image sensing device is greater than a threshold value;

wherein in response to a determination by said first shutter-speed determination device that the shutter speed of said main solid-state electronic image sensing device is greater than a threshold value, said determination device decides the gain of said white balance adjustment device regarding the color image data, which is output from said one or plurality of subordinate solid-state electronic image sensing devices, using the color image data that is output from said subordinate solid-state electronic image sensing device.

* * * * *